Dec. 5, 1939.                    L. SCUSA                    2,182,267
              APPARATUS FOR MEASURING TENSION STRESSES
                          Filed July 28, 1937
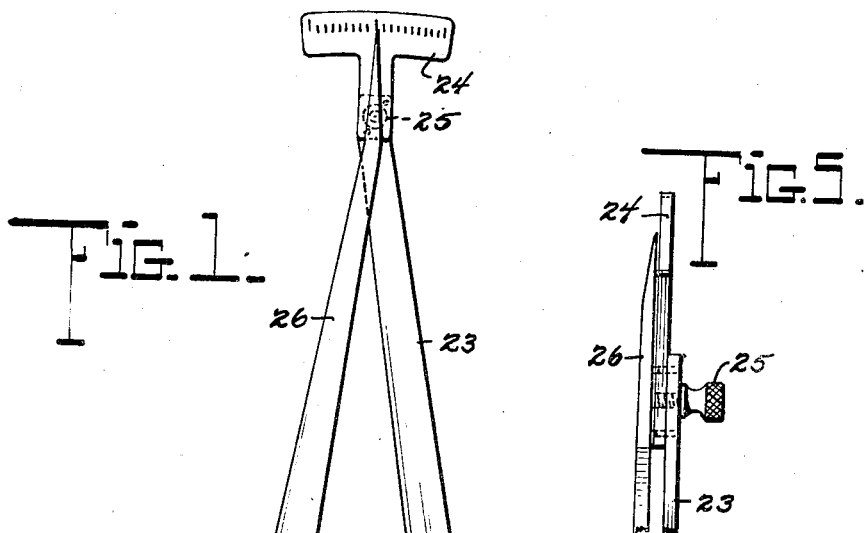
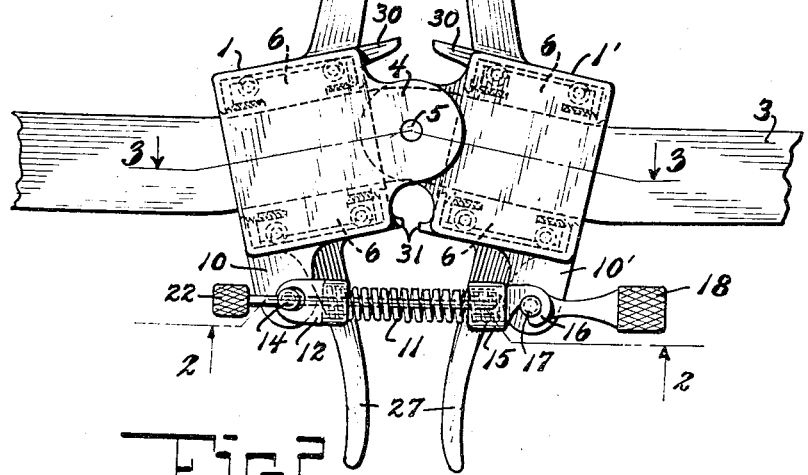
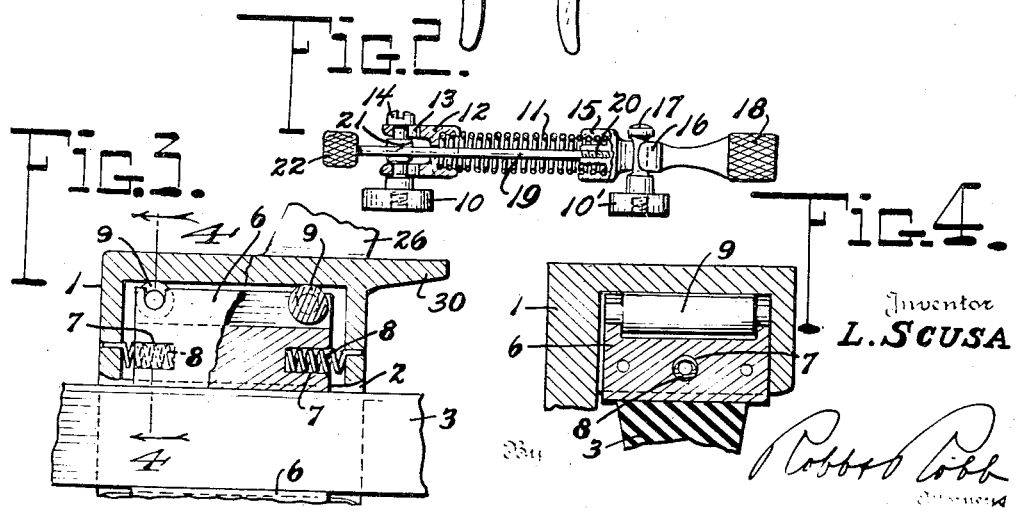
Inventor
L. SCUSA Patented Dec. 5, 1939

2,182,267

UNITED STATES PATENT OFFICE 2,182,267

APPARATUS FOR MEASURING TENSION STRESSES

Lino Scusa, Phoenix, N. Y., assignor to Harold E. Torell, Syracuse, N. Y.

Application July 28, 1937, Serial No. 156,215

9 Claims. (Cl. 265—1.6)

This invention appertains to apparatus for measuring tension stresses, and more especially, for ascertaining the degree of tension in flexible connectors such as belts, ropes, chains, wires, cables, and the like.

In the case of power transmission belts running over pulleys and serving to transmit power from a driving pulley to a driven pulley, it is very important that the proper initial belt tension be provided. In the first place, belt slippage is, in part at least, dependent upon the belt tension. For example, a too low belt tension results in excessive belt slippage and creates undue wear on the belt and loss of power efficiency. On the other hand, and in the second place, a too great belt tension unduly stretches the belt and may cause repeated belt breakage; but what is perhaps equally if not more important, a too great belt tension materially reduces the life of the belt oven under normal operating conditions. The term "belt," as used above and in the following description, is to be taken in its broad sense, and is intended to embrace equivalent connectors such as ropes, cables, chains, etc.

Up until the present time, the adjustment of the initial tension in belts has been more or less a matter of guesswork. I am aware, however, that a number of so-called tension measuring devices have been proposed, but to my knowledge, the same have not been put into extensive use primarily because of their inaccuracy, high cost and impracticability.

My invention has for its principal object to provide a simple and inexpensive means by which the degree of tension in belts and the like may be speedily and accurately determined, and for facilitating the attainment of a predetermined or optimum tension adjustment.

Another object of the invention is to provide a simple and compact portable instrument of rugged construction, which may be applied directly to the belt so as to automatically indicate the degree of tension therein. By reason of its simplicity and small size, the instrument requires no special skill on the part of the user, and it can be used in places not easy of access.

A still further object of the invention is to provide an instrument for measuring tension, having comparatively few parts, and substantially eliminating the friction factor which, in a large measure, has been the greatest source of difficulty in such instruments previously proposed.

Other and further objects and advantages of the invention will be hereinafter described, and the novel features thereof defined by the appended claims.

In the drawing:

Figure 1 is a view in front elevation of one form of instrument embodying my invention, and illustrating the manner of application thereof to a typical belt known as a V-belt;

Figure 2 is a horizontal sectional view, taken approximately on the line 2—2 of Figure 1;

Figure 3 is a view partly in section and partly in elevation, illustrating one of the frame members and the manner in which it is adapted to be mounted on a V-belt or the like, the frame member being shown in fragmentary vertical section taken in a plane behind that of Figure 1 so as to expose the belt engaging bearing members, the latter being shown partly in section and partly in elevation;

Figure 4 is a vertical sectional view, taken approximately on the line 4—4 of Figure 3; and Figure 5 is an enlarged fragmentary detail view of the upper portion of the instrument, in end elevation, and particularly showing the detachable calibrated scale which is associated with the movable pointer or indicator.

Like reference characters designate corresponding parts in the several figures of the drawing.

Generally stated, my new method for determining the tension in the belt or other flexible connector consists first in distorting the belt, and then measuring the reactive force exerted by the belt and tending to restore the belt to its normal undistorted condition. Specifically, I apply to a normally straight part of the belt, suitable means for displacing a short length of the belt to one side, preferably upwardly or downwardly in the case of a horizontal belt, thereby producing a slight kink or arc in the belt at the point of deformation, and then suitably interconnect a calibrated spring with the belt at opposite sides of the deformed portion of the belt, so as to measure the reaction of the belt tending to restore the kinked or arcuately deformed part to its normally straight condition. To facilitate the determination of the reactive force above referred to, the spring is interconnected with a movable pointer or indicator having associated therewith a graduated scale which will give a visible reading corresponding to the force applied to the spring. In this manner, I am able to determine whether the belt tension comes within the desired tension range recommended for the particular belt under consideration. If not, the belt tension may be adjusted in any of the usual ways until the tension reading of the instrument corresponds to the desired amount.

While the instrument may have a number of different forms, I have shown in the drawing the preferred construction, which I have found to be most practical and satisfactory for my purposes. Essentially, the instrument comprises two frame parts 1, 1', each having a recess or channel 2 extending thereacross at one side thereof for receiving spaced portions of the belt 3 therein. Each frame part is extended to one side, as at 4, and these corresponding extensions are pivotally interconnected, as at 5, and provide a smooth working, hinge-like joint, permitting the frame-like parts 1, 1' to freely move in the same plane with a rocking action about the connecting pin 5. Each frame part is preferably hollow, and has positioned therein at opposite sides of the belt recess 2, shiftable belt-engaging bearing members 6, which are normally free to move endwise in the frame members. Each of the bearing members 6 is preferably provided with sockets 7, 7 in its opposite ends, and each socket receives one end of a light compression spring 8, having its opposite end bearing against and fixed to the corresponding end of the frame member. The springs 8, 8 normally hold the bearing members 6 centralized and in spaced relation to the opposite ends of the frame members. Each bearing member 6 is preferably provided with suitable means for reducing friction between the bearing member and the frame member, and to this end, rollers 9 are rotatably mounted in the bearing members and are arranged so as to have rolling contact with the frame members, as best seen in Figures 3 and 4. Thus when the frame members 1, 1' are applied to the belt 3 by urging the frame members laterally towards the side of the belt so that the belt is received in the belt recess 2 in each of the frame members 1, 1', with the belt disposed intermediate the bearing members 6, 6 in each of the frame members, the bearing members 6, 6 are permitted to move slightly relatively to the frame members responsive to deformation of the belt, as shown in Figure 1. In the condition shown in Figure 1, one side of the belt is under a slight compression, whereas the opposite side is under a tension, at the points engaged by the respective bearing members 6, 6 in each of the frame members 1, 1', and since the bearing members are permitted to have a slight yielding movement in the frame members, this tension and compression just referred to is accommodated without introducing a friction factor into the instrument reading, and therefore the instrument reading will be reasonably accurate, as will hereinafter become more fully apparent. It must be borne in mind that in the case of leather, rubber and similar types of belts, the material is more or less compressible, which is to say that it will mat down if pressure is applied to the surface thereof over a relatively small area; and it is for this reason that I preferably provide the bearing members 6, 6 mounted in each of the frame members 1, 1' and thereby cause the frame members 1, 1' to substantially float freely on the belt 3 when applied thereto, as shown in Figure 1. The same is true in the case of rope connectors, the fibers of which are relatively compressible. For ropes, wires, cables and the like, the bearing members 6 would be provided with a surface generally corresponding to the curved surface of the rope, wire or cable, rather than the flat surface shown in the drawing in engagement with the upper and lower faces of the belt 3.

If desired, one or both of the frame members 1, 1' may be provided with an adjustable clamping screw extending therethrough into abutting engagement with one of the bearing members 6 so as to exert a clamping pressure upon the belt and thereby prevent the instrument from falling off of the belt or becoming accidentally displaced therefrom after application of the instrument to the belt. However, these clamping screws are not absolutely necessary since under normal conditions wherein the frame 1, 1' and bearing members 6, 6 are designed in different sizes to fit a belt of a certain cross-section, there will be no tendency for the instrument to fall off the belt, and in addition, the movable mounting of the bearing members 6, 6 in the frame members more readily permits the frame members to automatically adjust themselves to the belt when the belt is deformed or kinked as shown in Figure 1. I have found that the instrument will operate satisfactorily either with or without the clamping screws referred to above.

Extending downwardly from the bottom of each of the frame members 1, 1', there are provided the bosses or lugs 10, 10' which serve to interconnect a spring 11 between the frame members. One end of the spring is shown fixed in a bifurcated head 12 having apertures therein for receiving an attaching screw 14 by means of which the end of the spring may be secured to the boss or lug 10, as seen best in Figure 2. The opposite end of the spring is likewise secured to a head 15 having a hook-like extremity 16 adapted to be quickly and easily detachably engaged over a stud 17 carried by the lug or boss 10'. Manipulation of the hook 16 is facilitated through the provision of a handle or knob 18, preferably integrally formed with and projecting beyond the hook 16. Provision is also preferably made for limiting the stretch of the spring 11, and to this end, I provide a small rod 19 arranged axially within the spring 11 and having one end fixed to the head 15, as at 20. The other end of the rod 19 passes loosely through the head 12 and through a sleeve 21 formed as a part of the attaching screw 14. The free extremity of the rod 19 is provided wtih a head 22, preferably removably mounted thereon, which constitutes an abutment for limiting the stretch of the spring 11 beyond its elastic limit through engagement of the head 22 against the sleeve 21. Springs of different calibrations may be quickly and readily applied to the instrument by simply first unscrewing the rod 19 from the head 15 and then withdrawing rod 19, disconnecting the screw 14 from the boss 10 and disengaging the hook 16 from the stud 17, and then replacing the same with a new spring unit.

Extending upwardly from one of the frame members such as the frame member 1', is an arm 23, at the upper end of which is removably mounted a graduated scale 24 which is calibrated to correspond with the spring 11. Different scales 23 corresponding to different springs 11 may be secured to the arm 23 by means of the screw 25.

Extending upwardly from the other frame member, such as the frame member 1, is an indicator or pointer 26, normally lying in forwardly spaced relation to the arm 23 so as not to engage the same and introduce a friction factor in the instrument, the upper extremity of the pointer 26 extending to a position coacting with the graduations on the face of the scale member 24, as will be best understood from reference to Figure 1.

In the use of the instrument as just described, the frame members 1, 1' are applied to a normally straight part of the belt 3, the tension of which is to be determined. Before mounting the instrument on the belt, the hook 16 of the spring unit is preferably first disengaged from the stud 17 so that the frame members 1, 1' may be moved to a position in which the belt receiving recess 2 in each frame member is aligned with the recess in the other frame member, thereby facilitating the entrance of the belt into both recesses. A spring unit having a calibrated spring 11 corresponding to the recommended tension range of the belt under consideration is suitably mounted on the instrument by first securing the head 12 to the lug 10 by means of the screw 14. Then the frame members are rocked about the pin 5, which interconnects the same, to a position substantially as shown in Figure 1, bringing the stud 17 towards the screw 14 far enough to permit the hook 16 at the opposite end of the spring to be engaged over the stud 17. Manipulation of the frame members 1, 1' may be facilitated through the provision of handle members 27 depending from the bottom of the respective frame members.

In rocking the frame members 1, 1' to their positions as shown in Figure 1, the belt 3 is deformed or kinked between the points of spaced engagement of the frame members with the belt, so that after the spring 11 has been interconnected with the frame members, the reactive force of the belt tension tends to stretch the spring 11 responsive to the action of the belt tension normally tending to restore the deformed portion of the belt to its original substantially straight condition. As the spring stretches, the frame members 1, 1' rock about the pin 5 towards an aligned position, thereby causing the indicator or pointer 26 to move relatively to the graduated scale 24 and assume a position, when the spring 11 balances the belt tension, giving a visual reading of the degree of belt tension. The scale 24 may be graduated so that the instrument reading will be directly in pounds, or the graduations may be such that they may be converted into pounds through comparison with a table, chart or graph, or through mathematical calculation. In any case, however, the interchangeable springs 11 and scales 24 are suitably calibrated so as to indicate the relationship of the tension in the belt 3 to a predetermined or recommended optimum tension range for a belt of the type under consideration. If the instrument reading shows that the belt tension is too great or too little, the belt tension may be adjusted with or without removing the instrument from the belt, as preferred. Should the belt tension be greater than the maximum limit of the spring 11 and corresponding scale 24 which may have been selected for the instrument preparatory to measuring the belt tension, the spring will not be overstretched by reason of the fact that its elongation is preferably limited by the rod 11 and abutment 22 which are so arranged as to positively prevent the spring from being stretched to its elastic limit.

Not only may the instrument be used for determining the tension in a single belt or similar connector, but also it can be used on multiple V-belt drives and the like and on very wide belts so as to determine whether or not the belt pulleys and their shafts are substantially parallel. For example, in the case of a multiple V-belt drive, the instrument may be applied to the respective belts at the opposite sides of the multiple group, and if the two readings are substantially the same, the pulleys and shafts are then known to be substantially parallel. In the case of a wide, single, flat belt, the instrument may be applied first to one edge and then to the other, with the same purpose of determining the parallelism of the pulleys and shafts.

In order to limit the rocking movement of the frame members 1, 1' about the pin 5, the frame members are preferably respectively provided with abutments 30 and 31 at opposite sides of the pivotal axis and preferably adjacent to the upper and lower ends of the frame members as seen in Figure 1. The abutments 30, 30 are disposed in opposed relation and are somewhat longer than the abutments 31, 31 so that the former will abut against each other and limit pivotal movement of the frame members 1, 1' beyond their aligned positions to which they are initially preferably moved to enable the instrument to be applied to a straight part of the belt 3 at the commencement of the tension measuring operation. The other abutments 31, 31 may or may not be provided, and in any case, they must be sufficiently short to enable the frame members 1, 1' to be rocked about the pin 5 in such manner as to deform or kink the belt as shown in Figure 1 of the drawing. Pin 5 preferably lies at one side of the belt and is coextensive with the neutral or median plane of the belt.

While the specific details have been herein shown and described, the invention is not confined thereto, as changes and alterations may be made without departing from the spirit thereof as defined by the appended claims.

Having thus described my invention, what I claim as new and desire to secure by Letters Patent is—

1. A device of the class described, comprising a pair of frame members adapted to be mounted at two spaced points on and wholly carried by a flexible connector such as a belt or the like, means disposed substantially midway between said spaced points pivotally interconnecting said frame members so as to enable the same to be rocked to a position causing the portion of the belt intermediate the spaced points aforesaid to be displaced to one side of the normal position of the belt while under tension, said pivotal interconnection being wholly free of the belt, means yieldably interconnecting said frame members and serving to transmit force to the belt through the frame members at the two spaced points aforesaid to resist rocking movement of the frame members in a direction tending to restore the belt to its normal tensioned condition, and means for indicating the reactive force of the belt as measured by the yielding means aforesaid.

2. A device of the class described, comprising a pair of members adapted to be respectively clamped at two spaced points on and wholly carried by a flexible connector such as a belt or the like, means pivotally interconnecting said members so as to enable the same to be rocked to a position causing the portion of the belt intermediate the spaced points aforesaid to be displaced to one side of the normal position of the belt while under tension, said pivotal interconnection being wholly free of the belt, spring means yieldably interconnecting said members and serving to transmit force to the belt through the frame members at the two spaced points aforesaid to resist rocking movement of the frame members in a direction tending to restore the belt to its normal tensioned condition, and means for indicating the reactive force of the belt as measured by the spring means aforesaid.

3. A device of the class described, comprising a pair of frame members adapted to be mounted at two spaced points on and wholly carried by a flexible connector such as a belt or the like, means pivotally interconnecting the frame members at a point about midway between the same and substantially coextensive with the neutral plane of the belt whereby to permit the frame members to be rocked to a position causing the portion of the belt intermediate the spaced points aforesaid to be displaced to one side of the normal position of the belt while under tension, said pivotal interconnection being wholly free of the belt, means yieldably interconnecting said frame members and serving to transmit force to the belt through the frame members at the two spaced points aforesaid to resist rocking movement of the frame members in a direction tending to restore the belt to its normal tensioned condition, and means for indicating the reactive force of the belt as measured by the yielding means aforesaid.

4. A device of the class described, comprising a pair of frame members each having a laterally open belt-receiving channel or recess therein for enabling the frame members to be mounted at two spaced points on the belt and wholly carried thereby, means pivotally interconnecting said frame members so as to permit the frame members to be rocked to a position displacing the portion of the belt intermediate the spaced points aforesaid, to one side of its normal position while under tension, said pivotal interconnection being wholly free of the belt, spring means interconnecting the frame members and serving to yieldably transmit force to the belt through the frame members at the two spaced points aforesaid to resist rocking movement of the frame members in the opposite direction, and means for indicating the reactive force of the belt tending to restore the same to its normal tensioned condition as determined by the spring means.

5. A device of the class described, comprising a pair of frame members each having a belt-receiving channel or recess therein for enabling the frame members to be mounted at two spaced points on the belt and wholly carried thereby, bearing members movably mounted in said frame members and adapted to engage the opposite faces of the belt when the belt is received in the channel, means pivotally interconnecting said frame members so as to permit the frame members to be rocked to a position displacing the portion of the belt intermediate the spaced points aforesaid, to one side of its normal position while under tension, said pivotal interconnection being wholly free of the belt, spring means interconnecting the frame members and serving to transmit force to the belt through the frame members at the two spaced points aforesaid to yieldably resist rocking movement of the frame members in the opposite direction, and means for indicating the reactive force of the belt tending to restore the same to its normal tensioned condition as determined by the spring means.

6. A device of the class described, comprising a pair of frame members adapted to be mounted at two spaced points on and wholly carried by a flexible connector such as a belt or the like, means pivotally interconnecting said frame members so as to enable the same to be rocked to a position causing the portion of the belt intermediate the spaced points aforesaid to be displaced to one side of the normal position of the belt while under tension, said pivotal interconnection being wholly free of the belt, means yieldably interconnecting said frame members and serving to transmit force to the belt through the frame members at the two spaced points aforesaid to resist rocking movement of the frame members in a direction tending to restore the belt to its normal tensioned condition, means for limiting the yielding of said yieldable means, and means for indicating the reactive force of the belt as measured by the yielding means aforesaid.

7. A device of the class described, comprising a pair of frame members adapted to be mounted at two spaced points on and wholly carried by a flexible connector such as a belt or the like, means pivotally interconnecting said frame members so as to enable the same to be rocked to a position causing the portion of the belt intermediate the spaced points aforesaid to be displaced to one side of the normal position of the belt while under tension, said pivotal interconnection being wholly free of the belt, a coil spring disposed at one side of said frame members and yieldably interconnecting the same and serving to transmit force to the belt through the frame members at the two spaced points aforesaid to resist rocking movement of the frame members in a direction tending to restore the belt to its normal tensioned condition, means for limiting the stretch of said coil spring, and means for indicating the reactive force of the belt as measured by the coil spring aforesaid.

8. A device of the class described, comprising a pair of frame members adapted to be mounted at two spaced points on and wholly carried by a flexible connector such as a belt or the like, means pivotally interconnecting said frame members so as to enable the same to be rocked to a position causing the portion of the belt intermediate the spaced points aforesaid to be displaced to one side of the normal position of the belt while under tension, said pivotal interconnection being wholly free of the belt, a coil spring disposed at one side of said frame members and yieldably interconnecting the same and serving to transmit force to the belt through the frame members at the two spaced points aforesaid to resist rocking movement of the frame members in a direction tending to restore the belt to its normal tensioned condition, means for limiting the stretch of said coil spring, and means for indicating the reactive force of the belt as measured by the coil spring aforesaid, said last named means comprising a graduated scale fixed to one of the frame members and an indicator or pointer fixed to the other of said frame members and coacting with the graduated scale.

9. A device of the class described, comprising a pair of pivotally connected members adapted to be wholly supported at two spaced points on a body under tension, means for applying a known force to said body opposite to said tension, at said spaced points, through the pivotally connected members aforesaid, while permitting the portion of the body intermediate said spaced points to freely move in accord with any instantaneous tension condition, whereby to establish a balance of the known force against the tension of the body, and means for indicating the tension of said body responsive to the relative pivotal movement between said members in establishing the balance aforesaid.

LINO SCUSA.